R. A. CULLETON AND D. J. LEAHY.
GAS METER.
APPLICATION FILED AUG. 11, 1916.

1,351,842.

Patented Sept. 7, 1920.
3 SHEETS—SHEET 1.

Robert A. Culleton, Inventor
Daniel J. Leahy
By his Attorney
Thomas A. Hill

R. A. CULLETON AND D. J. LEAHY.
GAS METER.
APPLICATION FILED AUG. 11, 1916.

1,351,842.

Patented Sept. 7, 1920.
3 SHEETS—SHEET 2.

Robert A. Culleton, Inventor
Daniel J. Leahy,
By his Attorney
Thomas A. Hill.

UNITED STATES PATENT OFFICE.

ROBERT A. CULLETON AND DANIEL J. LEAHY, OF BROOKLYN, NEW YORK.

GAS-METER.

1,351,842. Specification of Letters Patent. Patented Sept. 7, 1920.

Application filed August 11, 1916. Serial No. 114,343.

*To all whom it may concern:*

Be it known that we, ROBERT A. CULLETON, a citizen of the United States, and residing in the borough of Brooklyn, county of Kings, city and State of New York, and DANIEL J. LEAHY, residing in the borough of Brooklyn, in the county of Kings and State of New York, have invented certain new and useful Improvements in Gas-Meters, of which the following is a specification, reference being had therein to the accompanying drawing.

Our invention relates to improvements in gas meters and contemplates a construction which facilitates the removal of the entire assembled interior parts conveniently and simultaneously, whereby the same are made accessible for inspection and repairs. The invention further contemplates certain improvements in the construction and arrangement of the gas measuring pockets or chambers, and the valve mechanisms, as well as means for making gas-tight certain working parts of the same.

Figure 1:
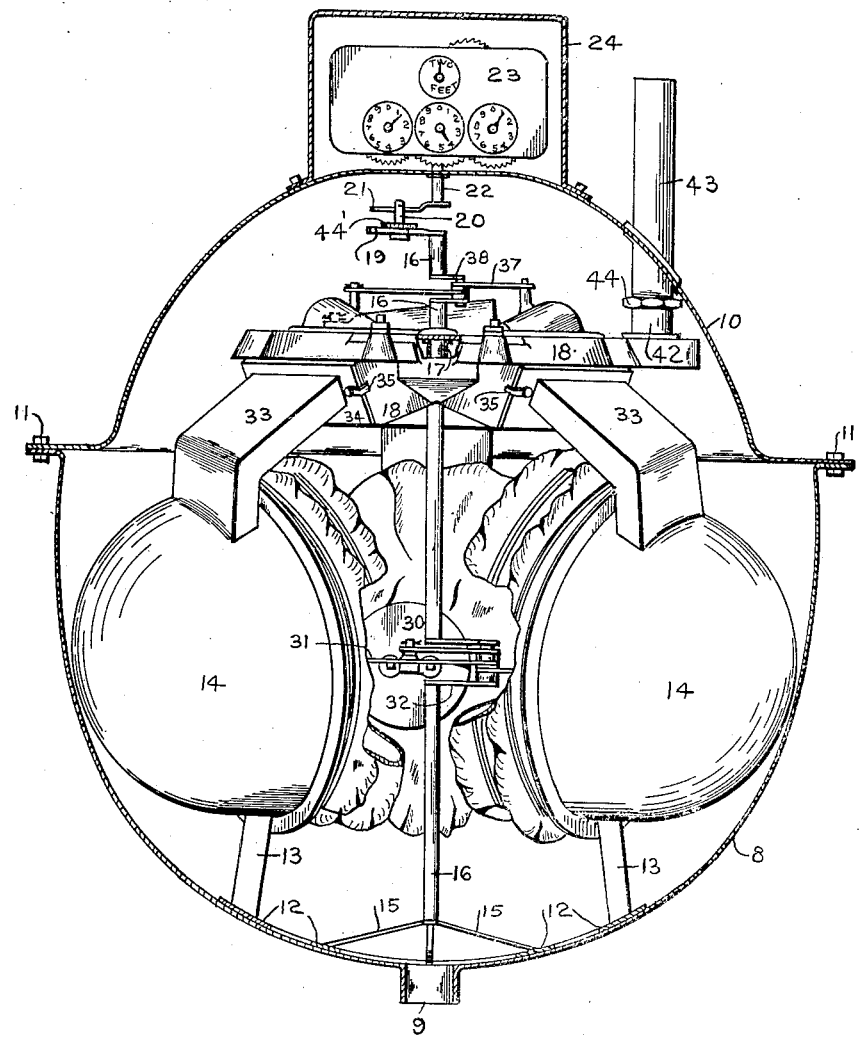
Figure 2:
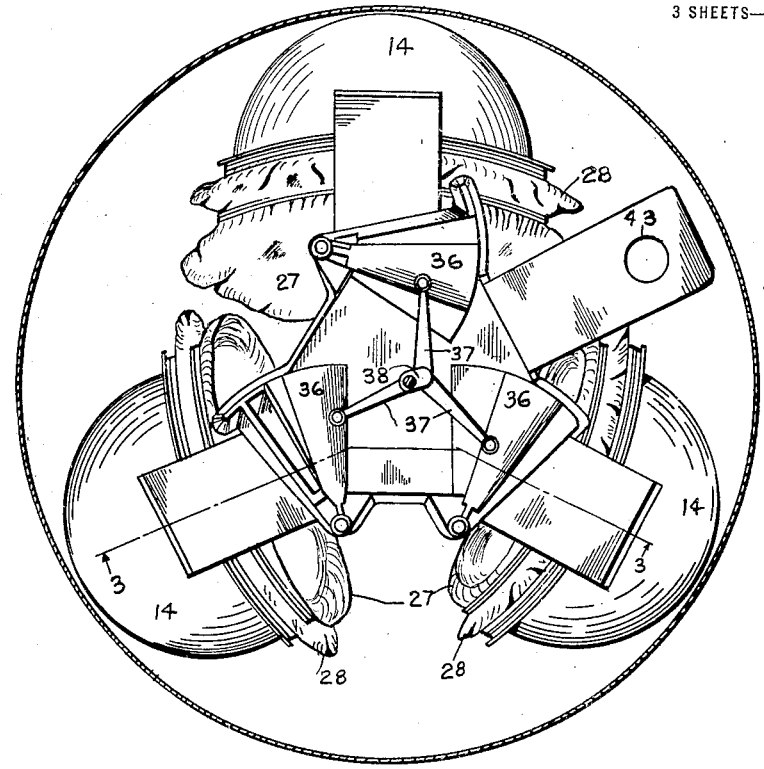
Figure 3:
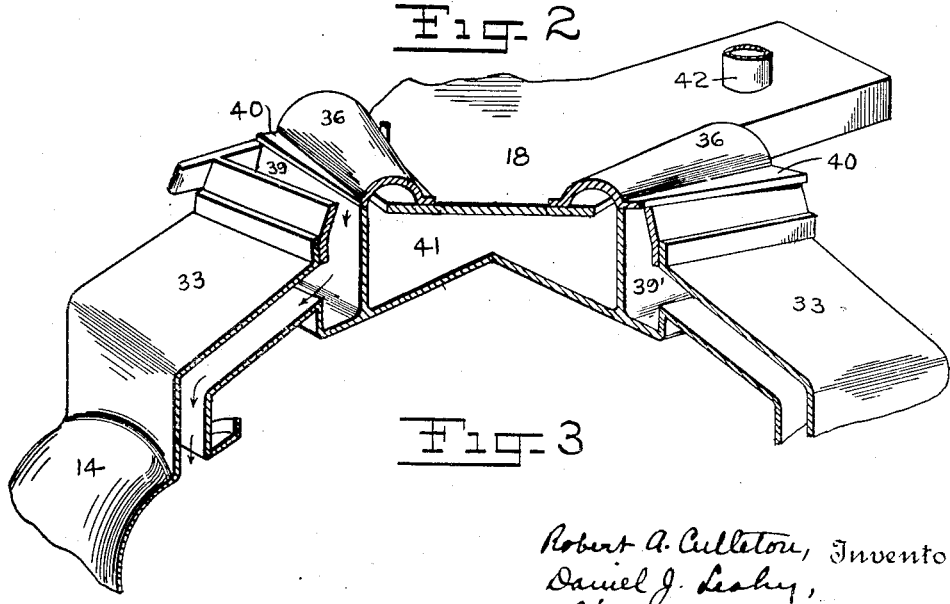
Figure 4:
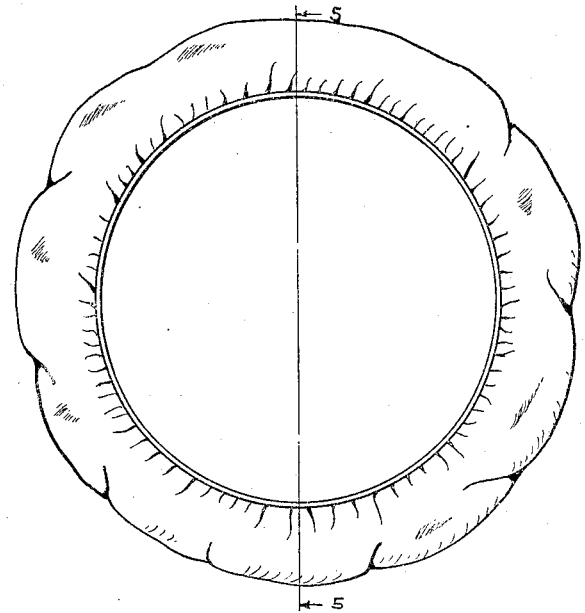
Figure 5:
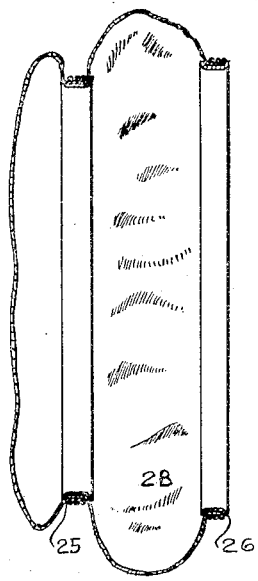
Figure 6:
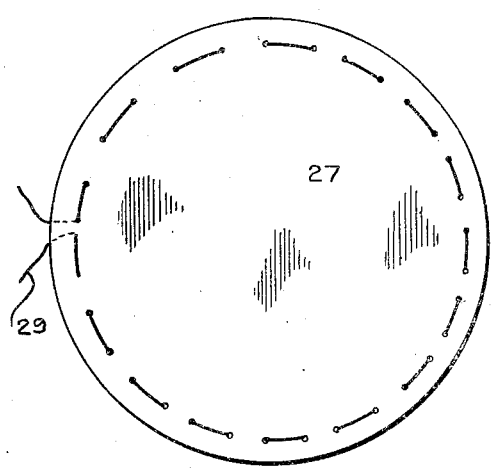

In Figure 1 we have illustrated an application of our invention as applied to an ordinary house gas meter in vertical cross section, partly broken away. Fig. 2 is a plan view with the upper part removed; Fig. 3 is an enlarged detail view of certain valve mechanism; Fig. 4 is an enlarged plan view of the head of one of the gas pockets; Fig. 5 is a cross section on the line 5—5 of Fig. 4; Fig. 6 is an enlarged plan view of the front cap or disk of one of the heads, and Fig. 7 illustrates a method for cutting the same, together with another portion of the head from the same piece of leather or other material from which these heads may be constructed.

8 indicates the shell, body or outside lower casing of the meter which is preferably provided with an inlet 9 through which the gas is supplied to the meter for the premises, and 10 indicates the top or cover of the meter which may be suitably secured to the shell 8 by any suitable means such as the bolts 11. 12 indicates a suitable ring or frame provided with the legs 13 carrying the metallic pans or chambers 14 of the measuring pockets of the meter, and 15 indicates the spider or support for the shaft 16, said shaft being also secured by said spider to the ring or frame 12, the same being adapted to rest in the bottom of the casing 8 as shown. The crank shaft 16 is rotatably mounted in the spider 15, and is adapted to pass through the cylinder or central tube or core 17 of the gas table 18, said shaft terminating at the top in the offset 19 having the projection 20 adjustable thereupon and adapted to rotate in the path of the projection 21 upon the spindle 22 of the usual form of registering device 23 secured within the housing 24 which may be provided with a transparent front. The bowls or metallic pans 14 of measuring pockets may be provided with peripheral sections such as shown in Figs. 4, and 5, and upon the face of which may be secured a disk which may be of flexible material such as leather or chamois shown in plan view in Fig. 6.

Figure 7:
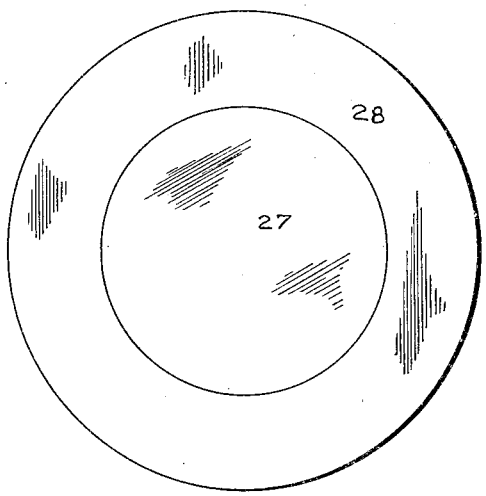

In cutting the collapsible peripheral section shown in Figs. 4 and 5 and the disk shown in Fig. 6, in order that the peripheral section may be seamless it has been found desirable to cut them as shown in reduced plan view in Fig. 7, that is to say, a sufficiently large disk of leather or other suitable material has a disk cut out of the center thereof sufficient to overlap the rim 25 which is slightly smaller in diameter than the rim 26. After the disk such as 27 shown in Fig. 6, and upon a reduced scale in Fig. 7, has been cut from the piece as shown in Fig. 7, the outer rim 28 which remains may then be secured upon the rings 25 and 26 which are of the same relative diameters as the inner and outer edges of the rim of leather 28, so that after the edges have been secured over the rings they may be securely bound thereto by twine or other suitable means which may then be shellacked to make the same gas-tight, thus providing a flexible telescopic section between the pans or metallic pockets 14 and the disk head 27. This disk head 27 may then be secured over the smaller rim such as 25 also by twine or other suitable means which may then be shellacked as before stated.

For the purpose of securing the leather in position upon the rim evenly before binding the same by twine as aforesaid it has been found convenient to pass a string such as 29 around the border of the same so that when in position the string may be drawn taut after which the leather may be shifted and adjusted before being finally bound and shellacked. Thus we have a gas pocket with a flexible full disk head and flexible, telescopic, peripheral section between the same and the body portion which is preferably constructed of sheet metal, and upon the front of each of the disk heads is also preferably secured a suitable metallic disk such as 30 to serve as a support for the levers such as 31 pivotally connected to the crank shaft 16 in the usual manner, so that as each gas chamber or measuring pocket is successively inflated and deflated the crank 32 of the shaft is caused to rotate said shaft.

18 indicates a valve table or chamber provided with a central circular passage or core 17 through which the shaft 16 passes, and provided with a series of internal passages shown to better advantage in Fig. 3. Each of the gas measuring pockets is provided with a passage such as 33 terminating in a door such as 34 which may be clamped to the gas table 18 by any suitable clamping means such as 35. Upon the top of the valve table 18 are provided suitable slide valve members such as 36 each of which is pivotally connected by rods such as 37 to the crank 38 of the shaft 16 as shown.

The operation of the meter is as follows: The gas from the street enters the meter through the inlet 9, passing upwardly all around the interior mechanism of the meter, finding the only outlet for escape through the particular valve or valves in the valve table which happen to be open. Referring to Fig. 3 the particular inlet available is indicated by the reference character 39, and the gas entering the same follows the arrows downwardly into one of the gas pockets 14 where the pressure of the same inflates the pocket thereby rotating the crank shaft through the connections aforesaid. This causes the slide 36 above the pocket 39 to move leftwardly looking at Fig. 3, covering the inlet 39, by the flange 40 as the adjacent valve uncovers the inlet 39', thus allowing the gas to enter the adjacent pocket through the passage 33. The valve 36 now moving farther leftwardly beyond the passage 39 allows the gas to escape into the interior 41 of the valve table 18 and while this is taking place the third valve of the combination is shifting to admit the gas to the particular pocket which it controls. This idea of producing what in fact is a meter to be operated from the pressure of the gas is of course not new, but the particular arrangement of valve and the gas table by which this result is accomplished as illustrated herein is believed to be new.

From the foregoing it will be readily understood that as one pocket is receiving the gas, the adjacent one is inclosing the gas therein, while the third pocket is establishing communication between its pocket and the gas table, which it will be observed communicates with the premises from the outlet 42 which may be connected with the pipe 43 by the nut 44 or by any other suitable means. It will also be observed that as the crank shaft is rotated due to the intake and exhaust of gas by the various pockets successively, the spindle 22 of the register 23 will be rotated, and the relative adjustment between the crank shaft 16 and said spindle may be fixed by shifting the pin 20 and securing the same in position upon the projection 19 by any suitable means such as the nut 44'.

For purposes of repair it will be readily observed that the outer shell or casing which may be of thin stamped steel or other material, may be dropped free simply by removing the bolts such as 11, and if it is desired to make further inspection or repair the house connection 43 may be disconnected by uncoupling the connection at 44, and the entire interior contents of the meter may then be conveniently removed and is thereupon immediately accessible. The gas pockets may be conveniently disconnected from the gas table by releasing the catches 35 so that it is not necessary to burn off any solder or engage in extensive mechanical effort for getting at any particular part of the mechanism as is usual with meters now in general use. It will readily be observed that all parts are conveniently accessible and it will of course be understood that the intermediate or peripheral collapsible and telescopic sections such as 28 may be eliminated if desired.

In fact, various modifications may be made in the construction and arrangement of parts without departing from the spirit of the invention as claimed.

We claim:—

1. In a device of the character described, the combination, with a casing, of a supporting member mounted within the casing, a plurality of measuring units supported from said member, a shaft, means operatively connecting said measuring units with said shaft, said shaft being journaled in the supporting member, valves for regulating the in-flow and out-flow of gas into and from said measuring units, operative connecting means including a crank and connecting rods between said valves and said shaft, the said valves being supported upon the supporting member, a cover for said casing, registering mechanism carried by said cover and adapted to be actuated by said shaft, disconnectible operating means between said shaft and said registering mechanism, the entire mechanism within the casing being removable as a unit from the interior thereof after removal of said cover.

2. In a device of the character described, the combination, with an upright casing, of a supporting member mounted near the upper end of said casing, a plurality of gas measuring devices depending from said supporting member, a hollow boss formed integral with the said supporting member, a post extending through said boss and formed integral with the supporting member and boss, a shaft extending through the said post, operative connections between the said shaft and the gas measuring devices, means for journaling the shaft at the lower end thereof, there being ports in the walls of the gas measuring devices and the hollow boss, valves for controlling the said ports and operative connections between said shaft and said valves.

3. In a device of the character described, the combination, with a casing, of a plurality of gas measuring devices within said casing, a shaft adapted to be operated by the said gas measuring devices, means operatively connecting said measuring devices with said shaft, a chambered member, there being ports in the chambered member and the gas measuring devices, valves for controlling said ports, operative connections between the said valves and the said shaft, an outlet pipe communicating with the chambered member, the upper end of said pipe being formed integral with said cover, the inner end of said pipe being formed to coöperate with the end of the pipe before mentioned to form a tight joint, the said pipes being separable as the cover is removed.

4. In a device of the character described, the combination, with a casing, of an inlet connection cast integral with one end of said casing, a measuring device within the casing, a member having a chamber with which said measuring device communicates, an outlet pipe from said chamber formed with a seat at its outer end, a cover for said casing, an outlet pipe integrally formed with the cover, the inner end of said last pipe coöperating with the seat upon the first mentioned pipe to form a tight joint, the said pipes being separable as the cover is removed from the casing.

5. In a device of the character described, the combination, with a casing, a plurality of measuring devices within said casing, and a shaft journaling member supported at one end of the casing, of a plate mounted in the casing near the other end thereof, a chambered member formed integral with said plate, a post extending through the said chambered member and formed integral therewith and with the plate, a shaft journaled at one end in said post and at its opposite end in the journaling member there being ports formed in communication with the chambered member and with the gas measuring devices, valves controlling said ports, operative connections between said valves and the shaft, and operative connections between the said shaft and the gas measuring devices.

6. In a device of the character described, the combination, with a casing, of a supporting member mounted within said casing near one end thereof, a plurality of gas measuring devices connected to said supporting member, a plate carried by said supporting member and spaced therefrom to form a chamber, a vertical shaft extending centrally through said supporting member, operative connections between the said shaft and the gas measuring devices, the walls of the gas measuring devices and the said chamber being provided with ports, and means operated by said shaft for controlling said ports.

7. In a device of the character described, the combination with a casing, of an inlet pipe connected thereto, a measuring device within the casing, a member having a chamber with which said measuring device communicates, a rigid outlet pipe, carried by said member and communicating with said chamber and formed with a seat at its upper end, a cover for said casing, an outlet pipe passing through said cover and rigidly connected therewith, the inner end of said pipe adapted to coöperate with the seat upon the first mentioned pipe to form a tight joint, the said pipes being separable as the cover is removed from the casing.

8. A meter comprising the combination, with a casing, of an inlet pipe connected thereto, a measuring device within the casing, a member having a chamber with which said measuring device communicates, a rigid outlet pipe carried by said member and communicating with said chamber, a cover for said casing, an outlet pipe rigidly attached to the cover and extending therethrough to the outside of said meter and having a detachable connection with said first mentioned outlet pipe, said measuring device and chambered member being so arranged as to be freely removable from said casing after the removal of said cover therefrom.

9. In a device of the character described, the combination of a casing, a plate mounted in said casing near one end thereof, a second plate carried by said first plate and spaced therefrom to form a chamber, a shaft extending centrally through said plates and chamber, a plurality of gas-measuring devices attached to one side of one of said plates, operative connections between said measuring devices and said shaft, said chambers and said gas measuring devices having ports, valves controlling said ports, operative connections between said valves and shaft, and means for journaling said shaft.

In testimony whereof we hereunto affix our signatures in the presence of two witnesses.

ROBERT A. CULLETON.
DANIEL J. LEAHY.

Witnesses:
EVELYN H. LEISTNER,
THOMAS A. HILL.